(12) United States Patent
Walker, Jr.

(10) Patent No.: US 6,994,741 B2
(45) Date of Patent: Feb. 7, 2006

(54) PROTECTIVE FILTER COVER

(76) Inventor: Robert A. Walker, Jr., 26954 White Horse Pl., Santa Clarita, CA (US) 91351

( * ) Notice: Subject to any disclaimer, the term of this patent is extended or adjusted under 35 U.S.C. 154(b) by 201 days.

(21) Appl. No.: 10/646,906

(22) Filed: Aug. 22, 2003

(65) Prior Publication Data

US 2004/0124130 A1    Jul. 1, 2004

Related U.S. Application Data

(60) Provisional application No. 60/405,396, filed on Aug. 23, 2002.

(51) Int. Cl.
*B01D 46/00* (2006.01)
*B01D 35/30* (2006.01)

(52) U.S. Cl. ............... 55/385.3; 55/495; 55/498; 55/500; 55/502; 55/503; 55/507; 55/510; 210/435; 210/440; 210/444; 210/452; 210/459; 123/198 E (58) Field of Classification Search ............... 55/385.3, 55/495, 497, 498, 500, 502, 503, 505, 507, 55/510, 480, 493; 210/435, 437, 440, 443, 210/444, 451, 452, 459; 123/198 E
See application file for complete search history.

(56) References Cited

U.S. PATENT DOCUMENTS

| | | | | |
|---|---|---|---|---|
| 2,273,210 A | * | 2/1942 | Lowther et al. | 55/503 |
| 2,742,177 A | * | 4/1956 | Watson | 55/503 |
| 3,546,853 A | * | 12/1970 | Claar | 55/510 |
| 3,832,833 A | * | 9/1974 | Cox | 55/500 |
| 4,367,081 A | * | 1/1983 | Harvey | 55/503 |
| 4,642,183 A | * | 2/1987 | Hebert | 210/443 |
| 4,767,530 A | * | 8/1988 | Gilliam et al. | 55/503 |
| 5,026,478 A | * | 6/1991 | Tanabe et al. | 55/503 |
| 5,167,818 A | * | 12/1992 | Baert et al. | 210/455 |
| 6,387,259 B1 | * | 5/2002 | Roll | 210/443 |
| 6,833,023 B1 | * | 12/2004 | Vandenberghe et al. | 55/503 |
| 2005/0126137 A1 | * | 6/2005 | Wang | 55/498 |

* cited by examiner

*Primary Examiner*—Jason M. Greene
(74) *Attorney, Agent, or Firm*—Christie, Parker & Hale, LLP (57) ABSTRACT

A protective cover for an engine filter having a cover upper portion and at least one cover sidewall attached to the cover upper portion, wherein the cover upper portion and the at least one cover sidewall form an enclosure, such that an inner perimeter of the enclosure has a size and a shape similar to a size and a shape of an outer perimeter of the engine filter.

5 Claims, 7 Drawing Sheets

PROTECTIVE FILTER COVER

CROSS-REFERENCE TO RELATED APPLICATION

This application claims priority under 35 U.S.C. §119(e) to U.S. Provisional Application Ser. No. 60/405,396 filed Aug. 23, 2002.

FIELD OF THE INVENTION

The present invention relates generally to a protective filter cover. More particularly, the present invention relates to a protective filter cover for an engine oil and fuel filters.

BACKGROUND OF THE INVENTION

Internal combustion engines use oil and fuel filters for the purpose of cleansing oil and fuel prior to lubrication and combustion, respectively, in the engine. Conventional oil and fuel filters are each constructed in the form of a cylindrical cartridge having a metal external housing that is specially constructed to accommodate a desired filtering medium, such as paper fiber or other media used to filter liquids within the housing. The cartridge typically includes a base having an internally threaded opening to allow the cartridge to be attached to a designated filter attachment location or locations on the engine. As such, most conventional oil and fuel filters are in the form of rotatably attachable cartridges that are easy to attach and detach from the engine.

The external housing of these filters, however, are typically comprised of a thin metal or plastic material that can be easily damaged. In addition, when used in conjunction with speed boats for example, where the engine is often exposed for visual appeal, the appearance of conventional oil and fuel filters tends to detract from an otherwise attractive engine, especially when an original oil or fuel filter has been replaced by a replacement oil or fuel filter. Also, continued exposure to the atmosphere, dust, debris and other external elements can corrode and wear out conventional oil and fuel filters.

SUMMARY OF THE INVENTION

A protective cover according to the present invention comprises a protective cover for an engine filter having a cover upper portion and at least one cover sidewall attached to the cover upper portion, wherein the cover upper portion and the at least one cover sidewall form an enclosure, such that an inner perimeter of the enclosure has a size and a shape corresponding to the size and a shape of an outer perimeter of the engine filter. The cover is secured to the outer perimeter of the filter by a clamp or other suitable securements.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF THE INVENTION

As shown in FIGS. 1–7, the invention is directed to a protective cover 10 for an engine filter 12. The filter 12 may be an air, oil or fuel filter, among other filters. The filter 12 is connected to an engine 14, such as an internal combustion engine, for use in an automotive or watercraft vehicle.

Figure 1A:
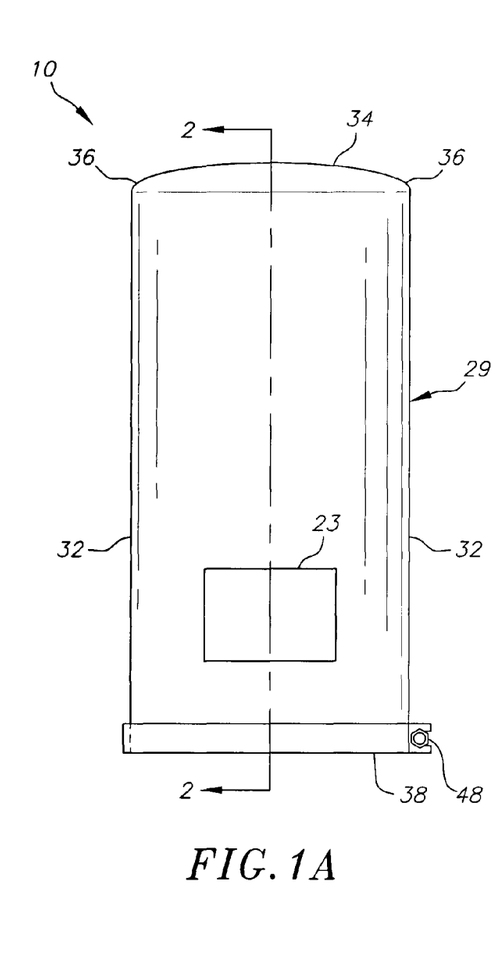
FIG. 1A is front view of a protective filter cover according to one embodiment of the present invention.
Figure 1B:
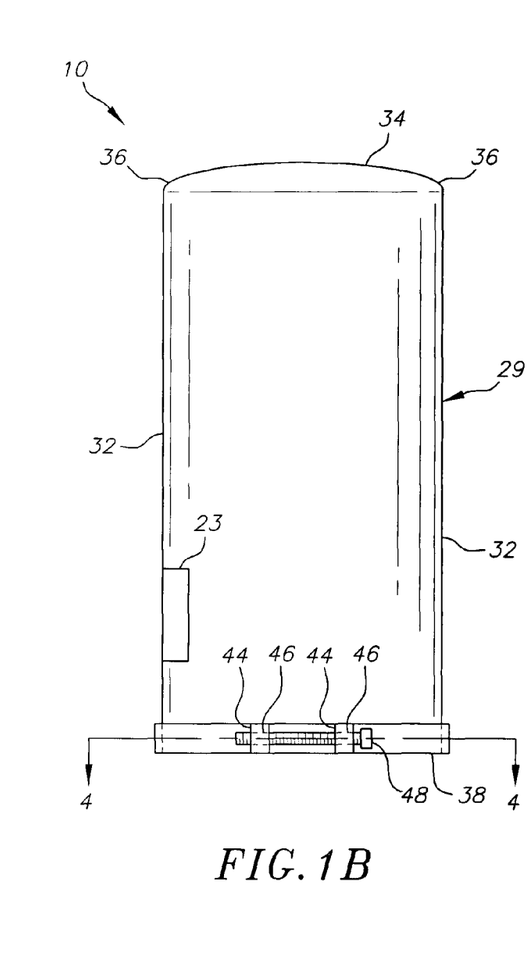
FIG. 1B is side view of the cover of FIG. 1A.
Figure 2:
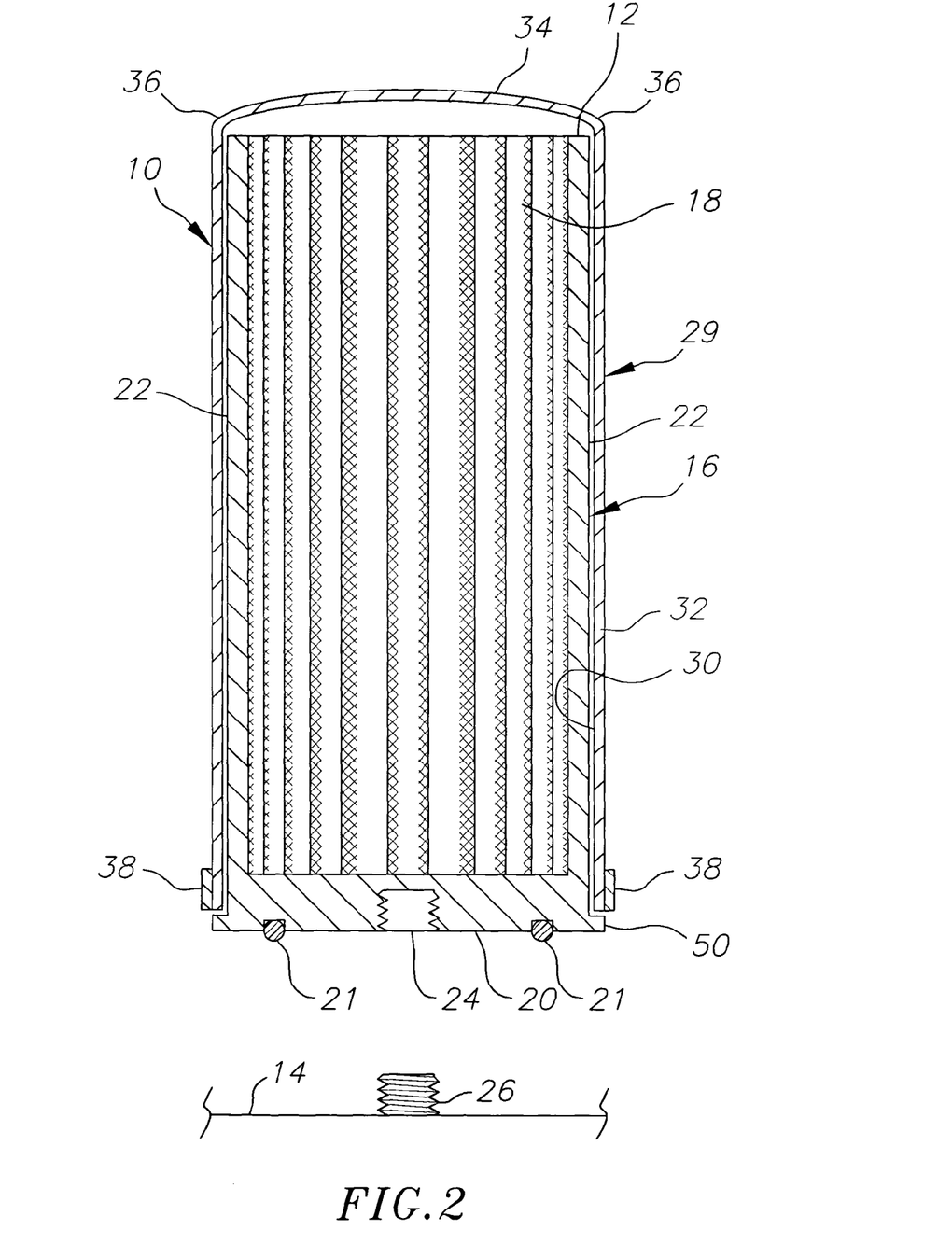
FIG. 2 is a cross sectional view of the cover of FIG. 1A taken along line 2—2 in FIG. 1A along with an engine filter enclosed therein and a schematic representation of an engine.

FIG. 2 shows an exemplary embodiment of the engine filter 12. In the depicted embodiment, the filter 12 has a generally cylindrical outer perimeter. However, the outer perimeter of the filter 12 may have other configurations, such as rectangular, polygonal or oval, among other configurations. The filter 12 may comprise a housing 16 for containing a filtering medium 18, such as paper, natural and man-made fibers or the like. In the depicted embodiment, the housing comprises a base 20 connected to spaced sidewalls 22, such that the filtering medium 18 is disposed within the sidewalls 22. The filter sidewalls 22 may be formed as one continuous structure or multiple adjacently connected structures. Similarly, the filter base 20 and the filter sidewalls 22 may be formed as one continuous structure or multiple adjacently connected structures.

The filter 12 may function, for example, to cleanse oil or fuel prior to entry into the engine for lubrication or combustion in the engine 14. As such, the filter 12 may be in fluid communication with the engine 14. In the depicted embodiment, the filter 12 comprises an aperture 24 having internally threaded sidewalls for threadably engaging an externally threaded protrusion 26 of the engine 14. In such an arrangement, the filter 12 may be easily attached to the engine 14 by rotatably engaging the threads of the filter opening 24 sidewalls with the threads from the engine protrusion 26. Similarly, the filter 12 may be easily detached from the engine 14 by rotatably disengaging the threads of the filter opening 24 from the threads from the engine protrusion 26.

However, the filter 12 may be attached to the engine 14 by other means, such as an interlocking connection, a press fitting connection or a snap fitting connection, among other connections. Additionally, the filter 12 may comprise an O-ring or gasket 21 to form a sealed connection to the engine 14. For example, the filter base 20 may comprises a circular slot for receiving the O-ring 21, such that the O-ring 21 may be disposed within the circular slot between the filter base 20 and an upper portion of the engine 14.

The cover 10 may be attached to the filter 12 to provide a cost effective means to protect the filter 12 from outside elements, such as dust, debris, water, rain, atmospheric elements or other external elements, that can wear, decay, scratch, dent, corrode or otherwise damage the filter 12. Consequently, in a preferred embodiment, the cover 10 is constructed from a material that is at least as structurally strong as the filter housing 16. In addition, the cover material is preferably either corrosion and/or water resistant or comprises one or more coatings that are corrosion and/or water resistant. In one embodiment, the cover material is a stainless steel material, such as 304 stainless steel, among other suitable materials and retains the filter in a vibration resistant condition.

In addition, in arrangements where the engine 14 is exposed for visual appeal, such as is common for various "hot-rod" vehicles, speed boat vehicles and yachts, the filter 12 tends to detract from the appearance of the engine 14, especially when the filter 12 is a replacement filter that was not originally sold with the engine 14. As such, the cover 10 has the added advantage of adding to the aesthetics of the engine 14.

As discussed above, the outer perimeter of the filter 12 may have any one of a variety of shapes. Correspondingly, the cover 10 may also have any one of a variety of shapes. For example, the cover 10 may have an outer perimeter 29 that is generally cylindrical, oval, rectangular, or polygonal, among other shapes. Similarly, the cover 10 may have an inner perimeter 30 that is generally cylindrical, oval, rectangular, or polygonal, among other shapes. Preferably, the inner perimeter 30 of the cover 10 corresponds to the outer perimeter of the filter 12.

In one embodiment, the cover 10 comprises spaced sidewalls 32 and a cover upper portion 34, wherein inner surfaces of the cover sidewalls 32 and the cover upper portion 34 combine to form the inner perimeter 30 of the cover 10, and outer surfaces of the cover sidewalls 32 and the cover upper portion 34 combine to form the outer perimeter 29 of the cover 10. As with the filter sidewalls 22, the cover sidewalls 32 may be formed as one continuous structure or multiple adjacently connected structures. Similarly, the cover sidewalls 32 and the cover upper portion 34 may be formed as one continuous structure or multiple adjacently connected structures.

Preferably, the cover inner perimeter 30 has a size and shape similar to the size and shape of the outer perimeter of the filter 12. For example, in the embodiment depicted in FIG. 2, the cover inner perimeter 30 closely corresponds to the outer perimeter of the filter 12 and forms a concentrically fitting enclosure around the outer perimeter of the filter 12.

In one embodiment, the cover upper portion 34 may be slightly curved. For example, the cover upper portion 34 may be convex with respect to the cover sidewalls 32. This convex configuration adds structural strength to the cover 10. In addition, junctures 36 between the cover upper portion 34 and the cover sidewalls 32 may be slightly rounded. This also adds to the structural strength of the cover 10. The cover 10 may also comprise a selected portion 23, for receiving a logo, trademark, or other source identifier, that is stamped, engraved or painted on the cover 10.

In one embodiment, the cover 10 forms a complete enclosure around the filter 12. However, in other embodiments, the cover 10 encloses only one or more portions of the filter 12. As such, the cover 10 should be large enough to form a protective barrier over at least a portion of the filter 12.

The cover 10 may be attached to the filter 12 by any one of a variety of means. Preferably, the cover 10 is removably attached to the filter 12, such that the cover 10 can be easily attached and detached from the filter 12, for example to allow the filter 12 to be replaced as needed.

Figure 3:
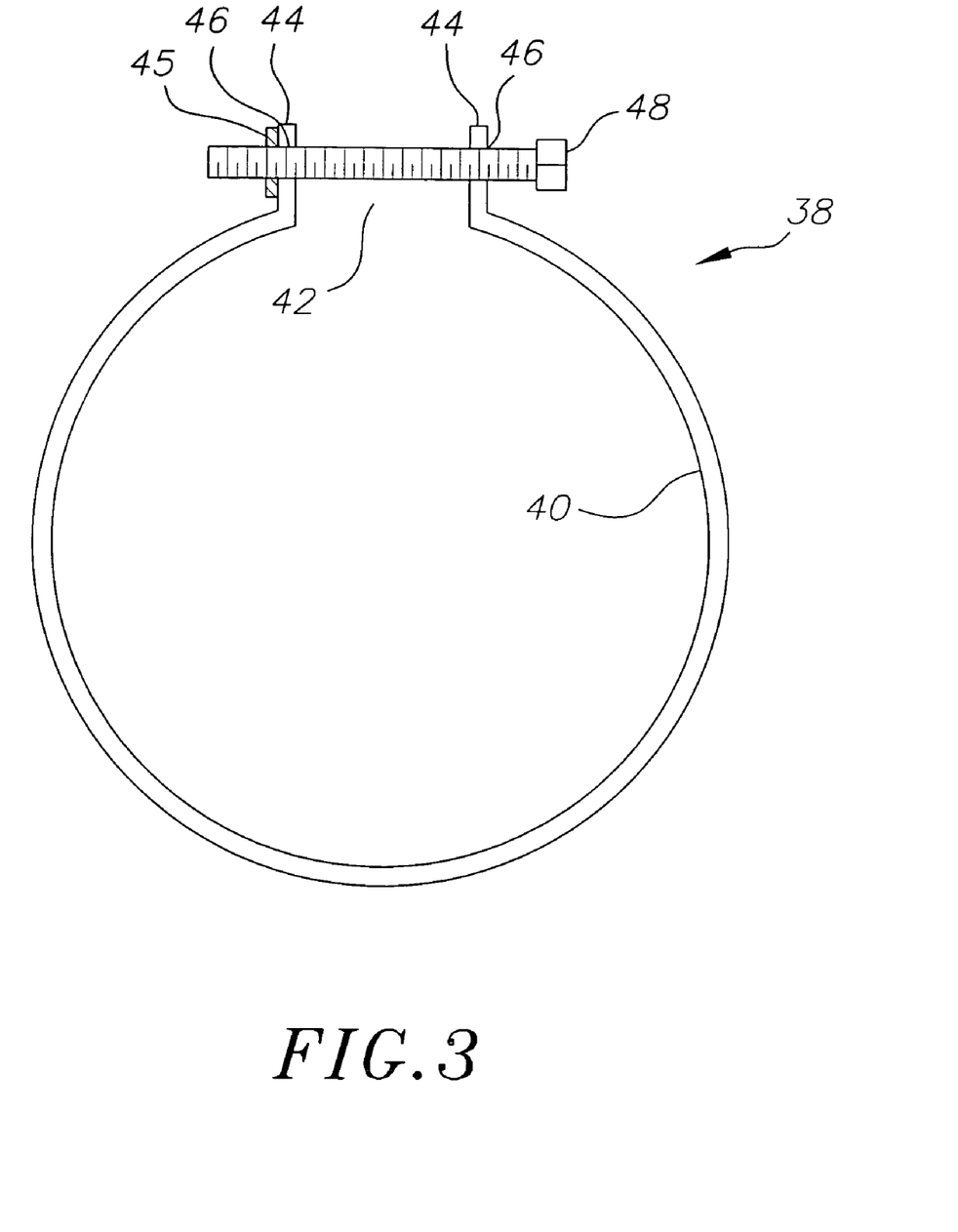
FIG. 3 is a top view of an adjustable band used in conjunction with the cover of FIG. 1A.
Figure 4:
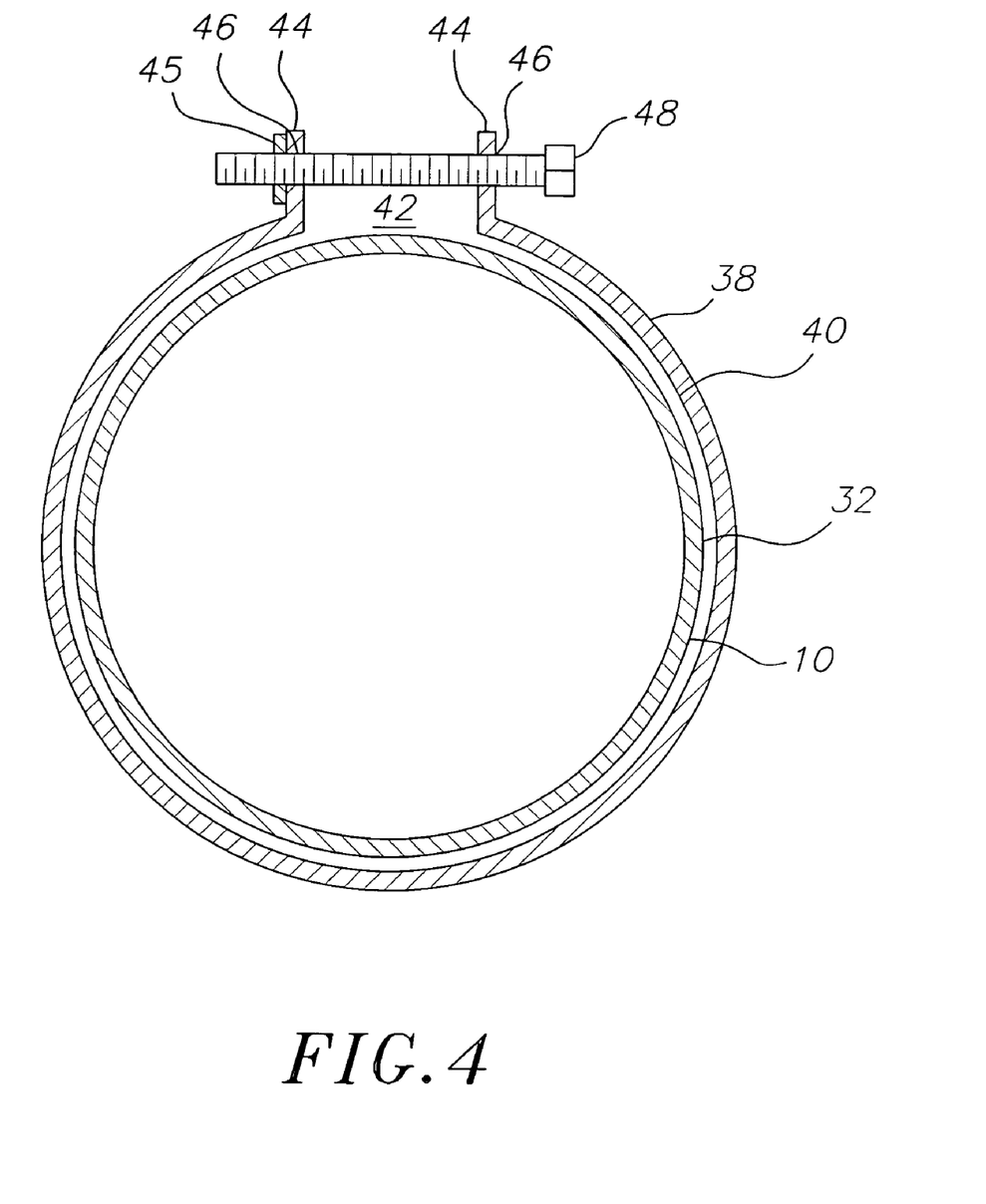
FIG. 4 is a cross sectional view of the cover of FIG. 1A taken along line 4—4 in FIG. 1B.

In one embodiment, the cover 10 is removably coupled to the filter 12 by use of a band 38, such as an adjustable ring band. The band 38 may be integrally formed with the cover 10, affixed to a portion of the cover 10 or removably connected to the cover 10. FIG. 3 shows an exemplary embodiment of the band 38. The band 38 may be formed to have a preformed shape, or the band 38 may be comprised of a flexible material, such that the band 38 conforms to the shape of the object to which it attaches.

The band 38 may also be adjustable, such that an inner perimeter 40 of the band is adjustable. For example, the band has an opening 42 and a pair of tabs 44 having inner surfaces that face the band opening 42. The tabs 44 have apertures 46 that receive a screw or bolt 48. One or both of the tab apertures 46 may be internally threaded, such that when the screw 48 is threaded into the internal threads of the tab apertures 46, the inner perimeter 40 of the band 38 is reduced and when the screw 48 is threaded out of the internal threads of the tab apertures 46, the inner perimeter 40 of the band 38 is expanded. Alternatively, the tab apertures 46 may be through holes and the screw 48 may be threadably engaged with a nut 45, such that when the nut 45 is threaded towards the screw 48, the inner perimeter 40 of the band 38 decreases and when the nut 45 is threaded away from the screw 48, the inner perimeter 40 of the band 38 expandes.

In the embodiment depicted in FIG. 2, a bottom end of the cover sidewalls 32 is positioned adjacent to a lipped portion 50 of the filter 12 and the band 38 is positioned around a lower portion of the cover 10. In such a configuration, the inner perimeter 40 of the band may be reduced to compress the cover sidewalls 32 (also shown in FIG. 4), such that a frictional connection between the cover 10 and the filter 12 is formed. Although the band 38 is shown disposed around a lower portion of the cover 10, the band may be positioned at other locations along a longitudinal axis of the cover 10 to accomplish the frictional connection between cover and filter.

Figure 5A:
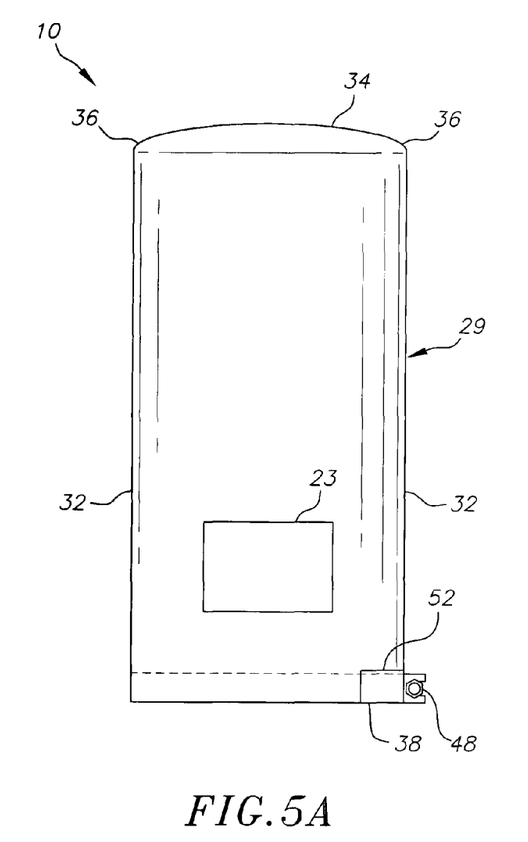
FIG. 5A is front view of a protective filter cover according to another embodiment of the present invention.
Figure 5B:
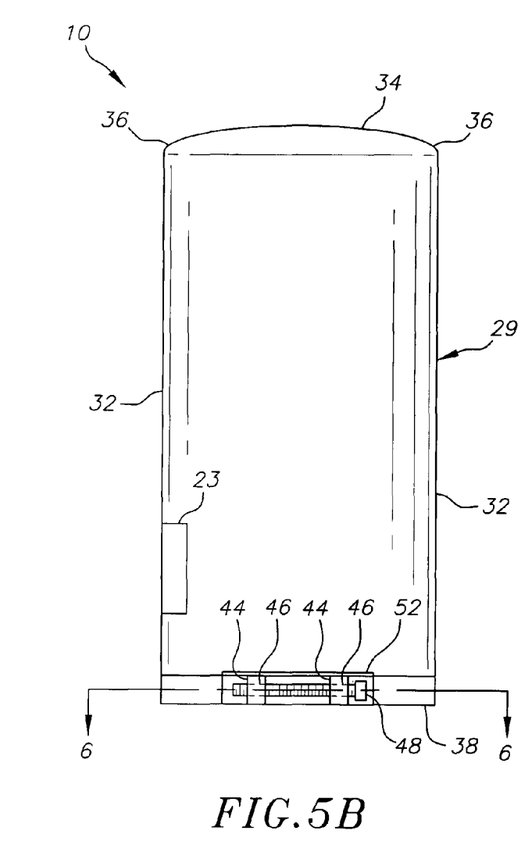
FIG. 5B is side view of the cover of FIG. 5A.
Figure 6:
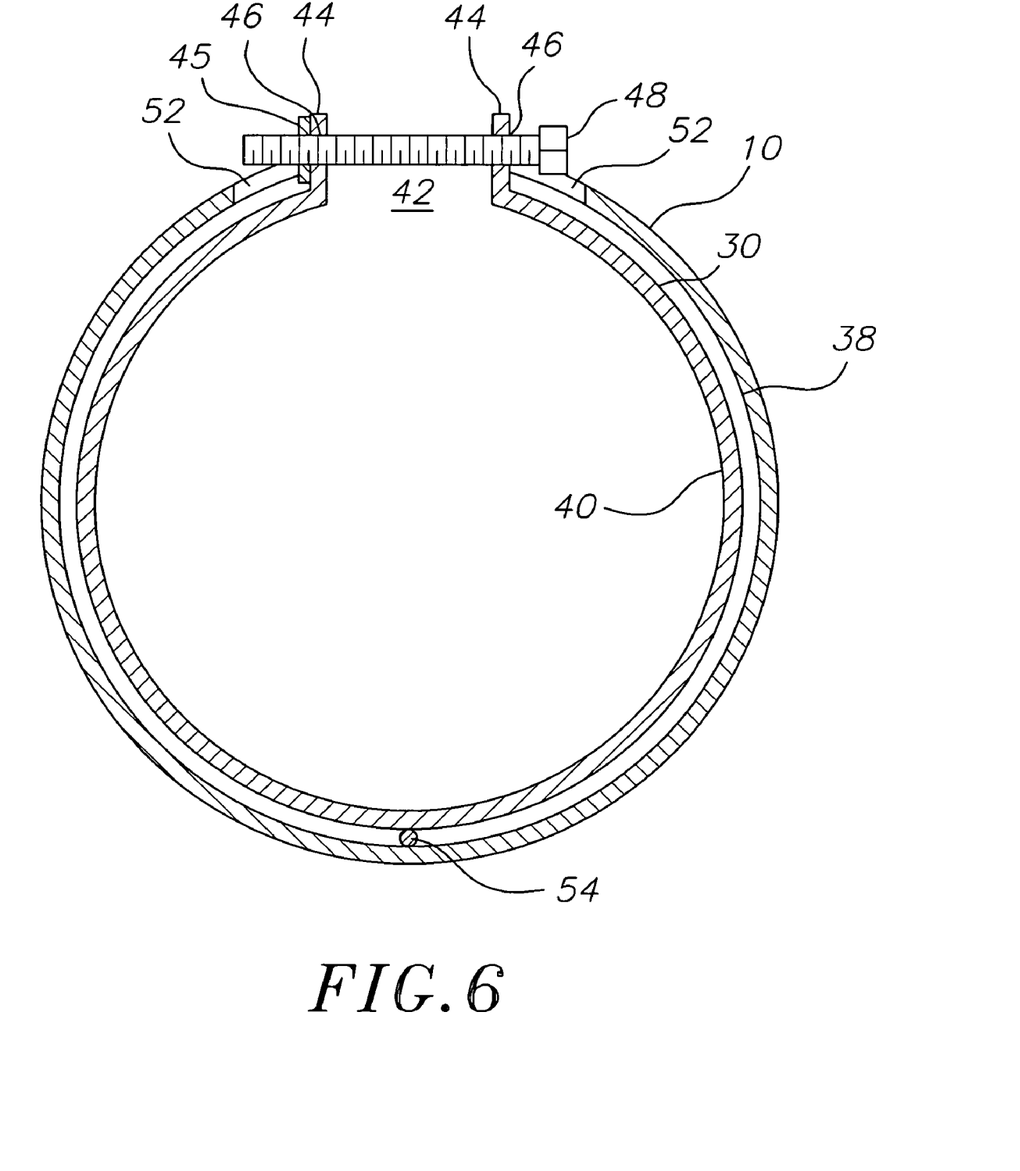
FIG. 6 is a cross sectional view of the cover of FIG. 5A taken along line 6—6 in FIG. 5B.

FIGS. 5A, 5B and 6 show an embodiment wherein the band 38 is incorporated interiorly of the cover 10. The band 38 may be integrally formed with the cover 10, affixed to a portion of the cover 10 or removably connected to the cover 10. In the embodiment depicted in FIG. 6, the band 38 is spot welded to a portion of the inner perimeter 30 of the cover 10, as illustrated by weld 54. In this embodiment, the cover 10 comprises a slot 52. The slot 52 allows for access to the band 38. For example, as shown most clearly in FIG. 6, the tabs 44 of the band 38 extend outwardly of the slot 52 such that the screw 48 may be accessed. As described above, the inner perimeter 40 of the band 38 may be enlarged and reduced by manipulation of the screw 48. In the configuration of FIG. 6, an appropriate manipulation of the screw 48 causes the inner perimeter 40 of the band 38 to reduce and compress the filter housing sidewalls 22, such that a frictional connection between the band 38 and the filter 12 is achieved and therefore engagement between the cover 10 and the filter 12 is formed.

Figure 7:
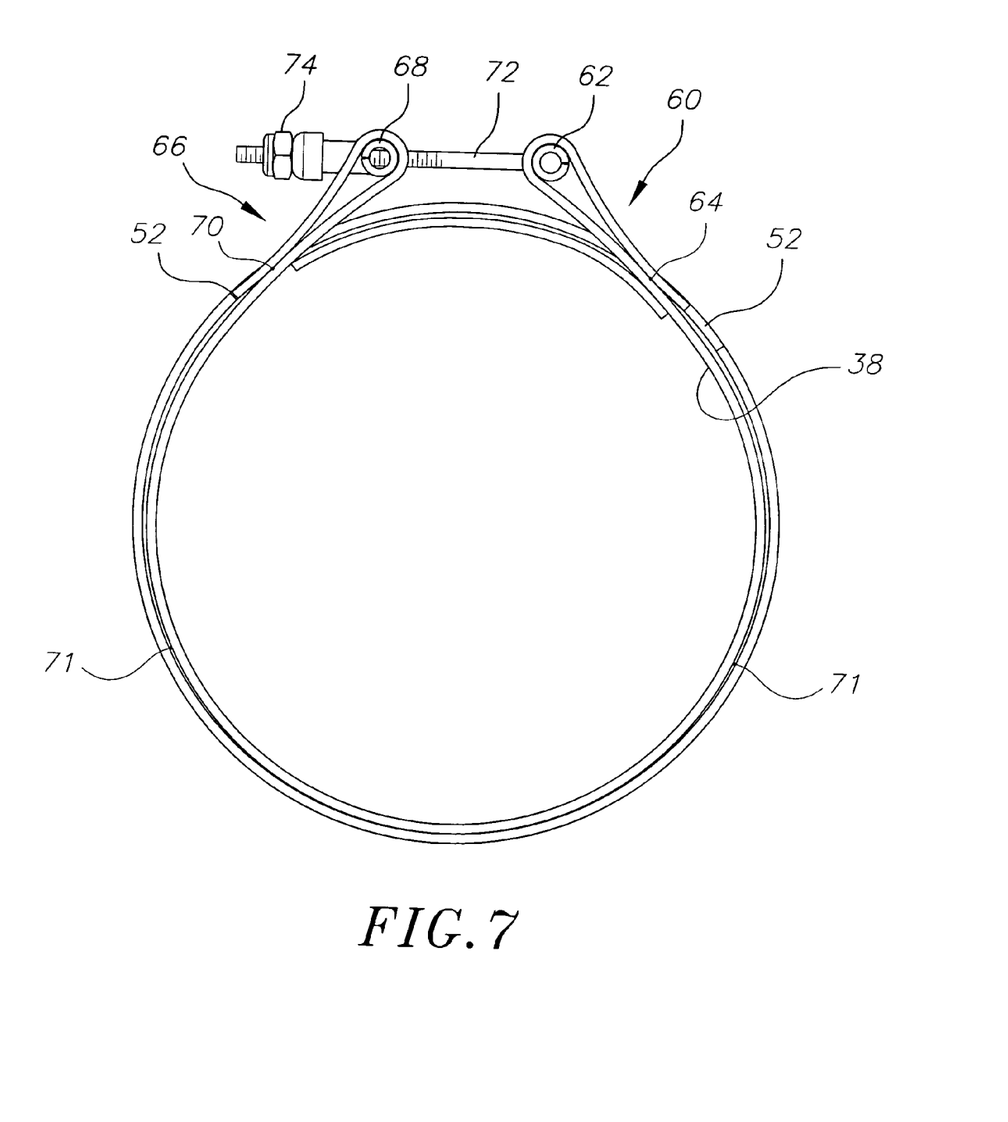
FIG. 7 is a plan view of the bottom end of another embodiment of the cover of the present invention.

Another embodiment of band 38 is shown in FIG. 7. As shown therein, band 38 is fixed to the interior perimeter of cover and secured thereto by one or more weldments 71. At one end 60, band 38 extends out of slot 52 and extends around a post 62 and loops back upon itself and is secured to itself at weld 64. The other end 66 of band 38 extends from the opposite side of slot 52 around post 68 and loops back upon itself at weld 70. Posts 62 and 68 have apertures extending through the posts transverse to their diameters. A threaded bolt 72 is secured at one end to post 62 and extends through post 68. A nut 74 is threaded onto bolt 72 and provides the mechanism for tightening and loosening the grip of claim 38 on a filter (not shown) located interiorly of the protective cover. Turning nut 74 on bolt 72 toward post 68 tightens clamp 38 and turning nut 74 to advance away from post 68 loosens clamp 38.

In addition, although the adjustable band 38 has been described as the attachment means for attaching the cover 10 to the filter 12, other attachment means are contemplated by the present invention. For example, for each of the embodiments described above, the cover 10 may be connected to the filter 12 by an interference fit, an interlocking fit, screw fastening, press fitting, snap fitting, bolting, clamping or magnetically connecting, among other connections.

The preceding description has been presented with references to presently preferred embodiments of the invention. Persons skilled in the art and technology to which this invention pertains will appreciate that alterations and changes in the described structures and methods of operation can be practiced without meaningfully departing from the principle, spirit and scope of this invention. Accordingly, the foregoing description should not be read as pertaining only to the precise structures described and shown in the accompanying drawings, but rather should be read as consistent with and as support for the following claims, which are to have their fullest and fairest scope.

What is claimed is:

1. A protective cover for an engine filter comprising;
   a cover upper portion;
   at least one cover sidewall connected to the cover upper portion, wherein the cover upper portion and the at least one cover sidewall form an enclosure, such that an inner perimeter of the enclosure has a size and a shape corresponding to a size and a shape of an outer perimeter of the engine filter; and
   a clamp for releasibly connecting the cover sidewall to the filter, said clamp being disposed concentrically within an inside surface of the at least one cover sidewall and connected to the at least one cover sidewall.

2. An assembly comprising:
   a protective cover comprising;
   a cover upper portion;
   at least one cover sidewall attached to the cover upper portion, wherein the cover upper portion and the at least one cover sidewall form an enclosure;
   an engine filter having an outer perimeter, wherein an inner perimeter of the enclosure has a size and a shape similar to a size and a shape of the outer perimeter of the engine filter, and
   a clamp for releasibly connecting the cover sidewall to the engine filter, said clamp being disposed concentrically within an inside surface of the at least one cover sidewall and connected to the at least one cover sidewall.

3. A protective assembly for filters for internal combustion engines comprising:
   a domed enclosure of a first predetermined height and width, an engine filter of a second predetermined height and width adapted to be secured to an internal combustion engine for receipt of fluids to be filtered from the engine, and
   an adjustable clamp mounted on the enclosure for securing and releasing the enclosure from the filter, the clamp being a band having a tightening mechanism extending and secured to the interior of the enclosure;
   wherein the first height and width of the enclosure is selected to receive and enclose the filter of the second height and width in a vibration resistant condition.

4. A protective assembly according to claim 3 wherein the clamp is mounted interiorly of the enclosure and wherein a slot is formed in a lower end of the enclosure, the ends of the clamp extending out of the slot and being connected together with an adjustable linkage.

5. An assembly according to claim 4 wherein the adjustable linkage is a bolt and nut combination for tightening and loosening the clamp relative to a filter located within the enclosure.

* * * * *